Nov. 1, 1955 W. B. KOCHNER 2,722,114
COUPLING SILENCER
Filed Sept. 13, 1952

Inventor:
William B. Kochner
By Bair, Freeman & Molinare
Attys

United States Patent Office 2,722,114
Patented Nov. 1, 1955

2,722,114
COUPLING SILENCER

William B. Kochner, St. Louis, Mo., assignor to Knapp-Monarch Company, St. Louis, Mo., a corporation of Delaware Application September 13, 1952, Serial No. 309,545

2 Claims. (Cl. 64—7)

This invention relates to a coupling silencer and particularly one adapted for the type of mixer for liquids and semi-solids known as a "Liquidizer" and shown in the Kochner and McCarron patent, No. 2,585,255, issued February 12, 1952.

The main object of the invention is to provide a coupling silencer for the type of coupling shown in the patent which effectively reduces the noise generated by the mixer when in operation.

Another object is to provide in combination with a coupler interposed between a power shaft and a mixer shaft, a means to silence the coupler consisting of a resilient or rubber-like lining between a socket of the coupling and the power shaft wherein the coupling and the power shaft are operatively connected together by a cross pin extending through the walls of the silencer.

A further object is to provide a silencer element to be interposed between a metallic shaft end and a socket of a metallic coupling member.

With these and other objects in view, my invention consists in the construction, arrangement and combination of the various parts of my coupling silencer, whereby the objects contemplated are attained, as hereinafter more fully set forth, pointed out in my claims and illustrated in the accompanying drawings, wherein:

Figure 1:
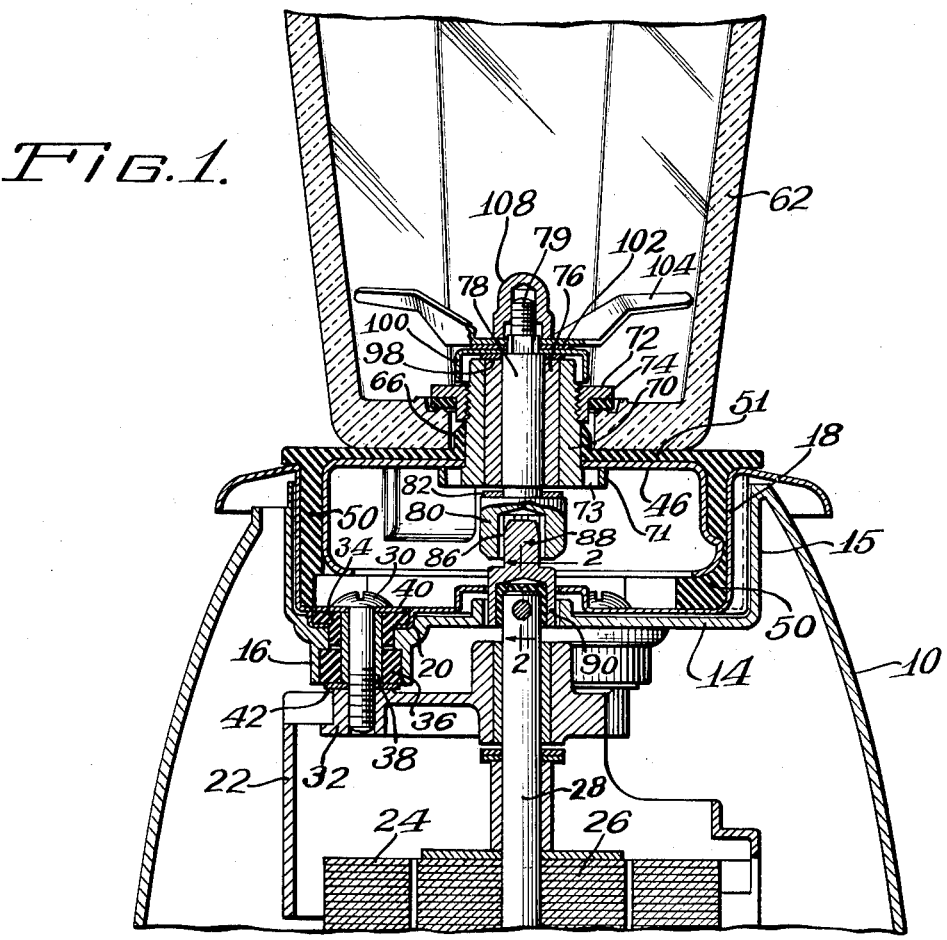
Figure 1 is a vertical sectional view of the type of mixer shown in the above mentioned patent and illustrates my coupling silencer in connection therewith.

On the accompanying drawing I have used the reference numeral 10 to indicate a housing for a power unit in the form of an electric motor consisting of a frame 22 and the usual stator 24 and rotor 26. The housing 10 has a top wall 14 from which three bosses 16 depend and the wall 14 together with an annular wall 15 comprise a socket in which a formed sheet metal pan-like receptacle is located. The receptacle 18 has three depending sockets 20 mounted in the bosses 16.

The motor frame 22 is supported in relation to the bosses 16 by means of mounting screws 30 extending through a pair of rubber-like sleeves 34 and 36 surrounding a metal sleeve 38 at the ends of which washers 40 and 42 are located. The screws 30 when tightened down, hold the elements 38, 40 and 42 as a unit with respect to the motor frame 22, the screws being threaded into bosses 32 thereof. This insulates the motor frame vibrationally with respect to the bosses 16 through the sleeves 34 and 36. In this way the transmission of vibration from the motor 24—26 to the housing 10 is minimized.

The receptacle 18 is adapted to receive a sheet metal base member 46 which is covered with a molded synthetic rubber sleeve 50 having a top wall 51. A bowl 62 is mounted on the base member 46 by means of a sleeve 70 having a flange 71 at its lower end engaging the base member 46 and the flange is provided with a pair of spanner wrench openings 73. A nut 72 is threaded on the sleeve 70 for securing the bowl 62 to the base member 46 and beneath this nut a gasket 74 serves to engage the lower wall of the bowl 62 which may be of glass and prevent its breakage as well as prevent leakage at this point. The top wall 51 of the sleeve 50 also extends upwardly along the sleeve 70 as at 66 to aid in the prevention of leakage.

The sleeve 70 contains a bushing type bearing 76 for an extension shaft 78 rotatably mounted therein. The lower end of this shaft has a head 80 provided with an eight-cornered socket 86 adapted to receive a square upper end 88 of a coupling member having a socketed head 90. The head 90 is provided with openings 96 in which a pin 92 is located, the pin being a tight fit in the upper end of a motor shaft 28 extending from the rotor 26 and a loose fit in the openings 96. Likewise the socket in the head 90 is a loose fit with relation to the shaft 28 to permit slight misalignment of the shaft 78 relative to the shaft 28 which might occur because of manufacturing tolerances without producing a binding action during the operation of the mixer. The socket is referred to by the reference numerals 91 and 93 which represent the side wall and bottom respectively of the socket.

The upper end of the extension shaft 78 is shouldered down and threaded as indicated at 79 to be received in a nut 108 which holds a lower blade 102 and an upper blade 104 against a cupped washer 100 over a thrust washer 98 and the upper end of the sleeve 70. Another thrust washer 82 is provided between the head 80 and the bearing sleeve 76.

My coupling silencer comprises a silencer element 110 formed of rubber or similar resilient material. It is in the form of an inverted cup, the side wall being indicated at 112 and the top wall at 114. An annular groove 116 is provided in the top wall 114 and at the center there is a depression 118 whereby the top of the silencer element 110 has a pair of annular concentric beads 120 and 122.

Figure 2:
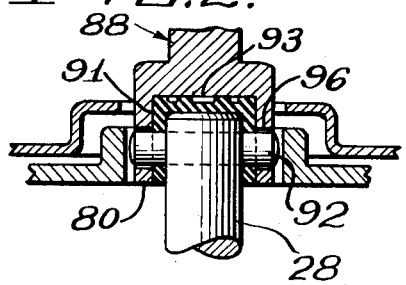
Figure 2 is an enlarged sectional view of the coupling and the silencer on the line 2—2 of Figure 1.
Figure 3:
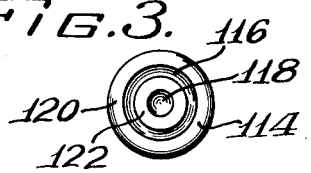
Figure 3 is a plan view of the coupling silencer element.
Figure 4:
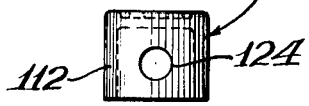
Figure 4 is a side elevation thereof.

The side wall 112 of the silencer element 110 is provided with a pair of perforations 124 through which the pin 92 extends as shown in Figure 2.

Practical operation

In the operation of mixers of the character disclosed, motors are provided which usually rotate in the neighborhood of 15,000 R. P. M. It is quite essential to have a coupling such as shown at 88 to serve as an operative connection between the motor shaft 28 and the extension shaft 78 which will permit slight misalignment of the shafts, particularly because of the floating mounting of the bowl 62 on the rubber sleeve 50 interposed between the base member 46 and the receptacle 18, which sleeve is necessary to minimize vibration and noise of operation.

I have found that considerable noise, however, is still developed in the type of coupling shown in the above mentioned patent, but that the greater percentage of this noise may be eliminated by means of a coupling silencer of the character herein disclosed and claimed. Evidently there is considerable impact between the pin 92 and the sides of the openings 96 in the coupling member 88, when such silencer is not used. When the silencer is used, however, it isolates the metallic shaft 28 from the walls 91 and 93 of the socket in the head 80 of the coupling member 88, and the result (determined from actual physical comparison during operation of both types of couplings) is a reduction of noise to only a very small percentage of the noise developed when my coupling silencer is not used. The silencer is specifically designed for the type of connection shown in the coupling member of the patent referred to and very effectively produces the desired results.

Some changes may be made in the construction and arrangement of the parts of my coupling silencer without departing from the real spirit and purpose of my invention, and it is my intention to cover by my claims any modified forms of structure or use of mechanical equivalents which may be reasonably included within their scope.

I claim as my invention:

1. In a coupling silencer for a liquefier having a mixer shaft and a motor shaft, a coupling member between said shafts having a socket to receive one of them, and means to reduce noise during the operation of said liquefier comprising a cup-shaped resilient member interposed between said socket and said one of said shafts, said cup-shaped member having side and top walls lining the side and bottom walls respectively of the socket of said companion coupling member, the top wall of said cup-shaped member being formed with a plurality of raised concentric annular beads for positively engaging the bottom wall of said socket.

2. A coupling silencer for liquefiers having a power shaft and a mixer shaft with a coupling between them, the coupling having a socket receiving the end of the power shaft, said silencer comprising a resilient cup-like member in said socket receiving said power shaft, and a cross-pin through said power shaft cup-shaped member and socket, the openings for said cross-pin being slightly larger in said coupling than the pin, and the pin being rigidly mounted in the power shaft, said cup-shaped member having side and top walls lining the side and bottom walls respectively of the socket of said coupling, the top wall of said cup-shaped member being formed with a plurality of concentric annular beads for positively engaging the bottom wall of said socket.

References Cited in the file of this patent

UNITED STATES PATENTS

| | | |
|---|---|---|
| 2,154,077 | Sampson | Apr. 11, 1939 |
| 2,558,589 | Skolfield | June 26, 1951 |
| 2,585,255 | Kochner et al. | Feb. 12, 1952 |
| 2,589,820 | Konchan | Mar. 18, 1952 |